US012697893B2

(12) United States Patent
Donnelly et al.

(10) Patent No.: US 12,697,893 B2
(45) Date of Patent: Aug. 4, 2026

(54) SYSTEM AND METHODS FOR ELECTRIC AIRCRAFT CHARGER COMMUNICATION

(71) Applicant: BETA AIR, LLC, South Burlington, VT (US)

(72) Inventors: Richard Donnelly, South Burlington, VT (US); John Charles Palombini, South Burlington, VT (US); Ed Hall, South Burlington, VT (US); Cole William Hanson, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 800 days.

(21) Appl. No.: 17/966,428

(22) Filed: Oct. 14, 2022

(65) Prior Publication Data

US 2024/0123856 A1    Apr. 18, 2024

(51) Int. Cl.
B60L 53/66        (2019.01)
B60L 53/62        (2019.01)

(52) U.S. Cl.
CPC .............. B60L 53/66 (2019.02); B60L 53/62 (2019.02); B60L 2200/10 (2013.01)

(58) Field of Classification Search
CPC ........ B64U 50/30; B64U 50/31; B64U 50/32; B64U 50/33; B64U 50/34; B64U 50/35; B64U 50/36; B64U 50/37; B64U 50/38; B64U 50/39; B60L 2200/10
See application file for complete search history.

(56) References Cited

U.S. PATENT DOCUMENTS

| | | | |
|---|---|---|---|
| 11,273,724 B1 | 3/2022 | Palombini | |
| 2011/0106329 A1* | 5/2011 | Donnelly | B60L 53/665 320/109 |
| 2018/0203465 A1* | 7/2018 | Suzuki | G05D 1/6545 |
| 2019/0077519 A1* | 3/2019 | Husain | B64F 1/222 |
| 2019/0190291 A1* | 6/2019 | Waters | B64C 11/006 |
| 2022/0070792 A1* | 3/2022 | Lekutai | H04W 52/282 |
| 2022/0258645 A1 | 8/2022 | Bower | |
| 2023/0302940 A1* | 9/2023 | Wakabayashi | B60L 53/64 |

* cited by examiner

*Primary Examiner* — David V Henze
(74) *Attorney, Agent, or Firm* — Hoffman Warnick LLC

(57)            ABSTRACT

In an aspect a system for electric charger communication is presented. A system includes a first networking component and sensor of a first electric charger. The system includes at least a processor communicatively connected to a first networking component and the sensor. The system includes memory communicatively connected to at least a processor, wherein the memory contains instructions configuring at least a processor to receive the at least a charger metric from the sensor and transmit the at least a charger metric to the network using the first communicative connection, wherein the at least a charger metric comprises a charger status.

16 Claims, 7 Drawing Sheets

200

SYSTEM AND METHODS FOR ELECTRIC AIRCRAFT CHARGER COMMUNICATION

FIELD OF THE INVENTION

The present invention generally relates to the field of communication networks. In particular, the present invention is directed to a system for electric aircraft charger communication and a method of using the same.

BACKGROUND

Modern electric charger communications are limited and unoptimized. A lack of shared information related to specifications of electric chargers and corresponding aircraft can lead to slowed and expensive processes in the development of electric chargers.

SUMMARY OF THE DISCLOSURE

In an aspect, a system for electric charger communication is presented. A system includes a network and a first electric charger. The first electric charger includes a sensor configured to detect a charger metric of the first electric charger; a first networking component installed on the first electric charger and configured to connect the first electric charger to the network via a first communicative connection; at least a processor communicatively connected to the first networking component and the sensor; and a memory communicatively connected to the at least a processor, the memory containing instructions configuring the at least a processor to: receive the at least a charger metric from the sensor; and transmit the at least a charger metric to the network, wherein the at least a charger metric includes a charger status.

In another aspect, a method of electric charger communication is presented. The method includes detecting, through a sensor communicatively connected to a first charger, a charger metric, connecting, by a first networking component, a first electric charger via a communicative connection to a network, receiving, from a sensor communicatively connected to the first charger, an at least a charger metric, and transmitting, by a processor, the at least a charger metric to the communicative connection, wherein the at least a charger metric includes a charger status.

These and other aspects and features of nonlimiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system for electric aircraft charger communication. In an embodiment, a system may include at least a processor and a memory communicatively connected to the at least a processor. A system may be configured to configure at least a networking component to establish a communicative connection between the at least a networking component and another networking component.

Aspects of the present disclosure can be used to enable communication between an electric charger and other devices and/or systems. For instance, and without limitation, system may enable communication between a plurality of electric chargers. In another instance, and without limitation, system may enable communication between an electric charger and a stakeholder. In nonlimiting embodiments, system may create a communication network that facilitates communication between one or more electric chargers and, for example, an electric aircraft, database, control tower, remote pilot, and/or other electric aircraft. Aspects of the present disclosure can also be used to establish an optimal communicative connection. This is so, at least in part, a communication of charging data may be efficiently transmitted. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
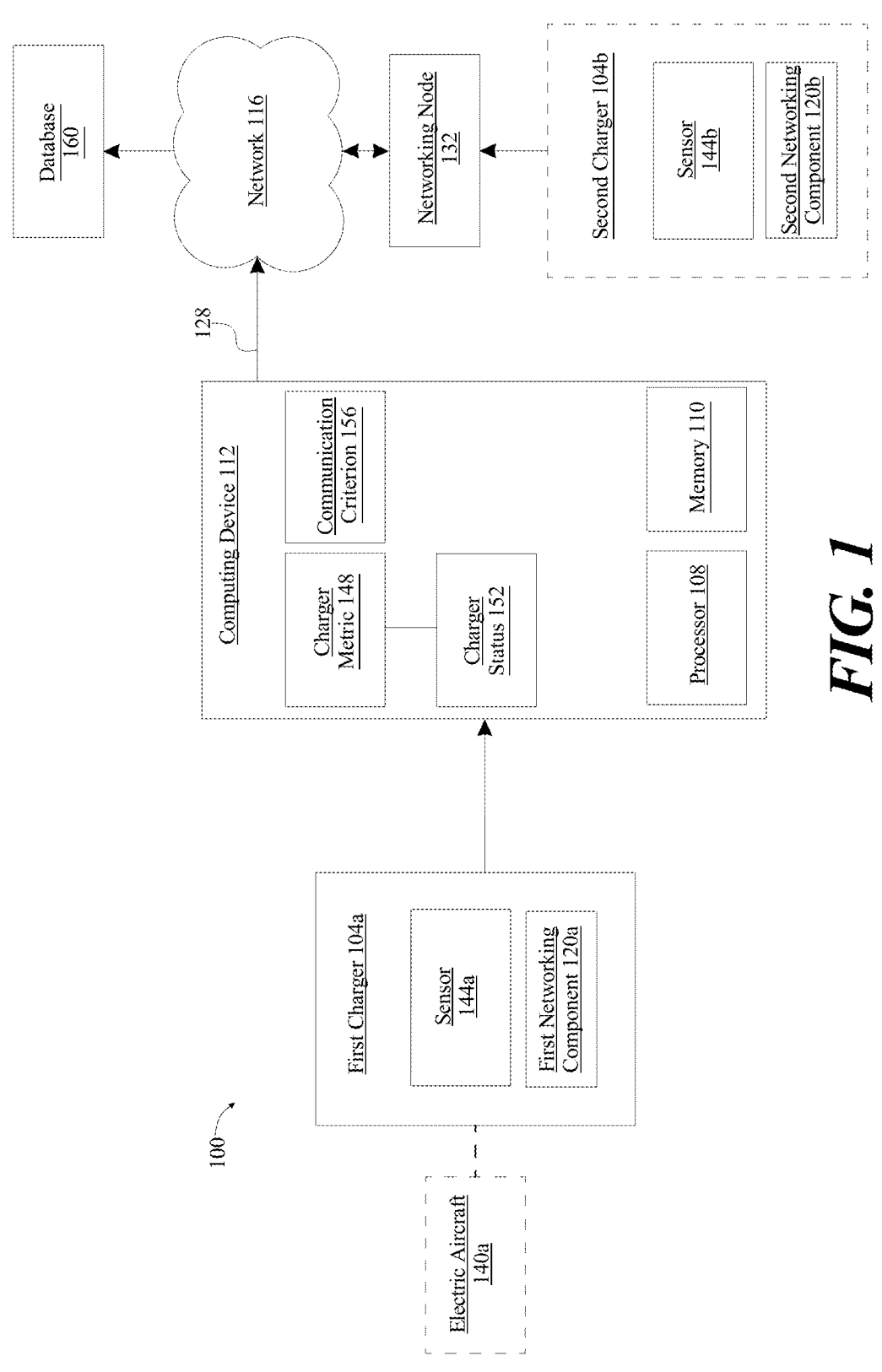
FIG. 1 is a diagram of an exemplary embodiment of a system for electric charger communication in accordance with one or more embodiments of the present disclosure.

Referring now to FIG. 1, an exemplary embodiment of a system 100 for electric aircraft charger communication is illustrated. System 100 may include one or more electric aircraft chargers 104 (also referred to in this disclosure as an "electric charger" or "charger"), sensors 144, computing devices 112, network 116, any combination thereof, and the like. In some embodiments, system may include an electric aircraft 140, such as, for example, and electric aircraft 140*a* being charged by first charger 104*a*. Electric aircraft 140 may include a vertical take-off and landing aircraft, such as eVTOL 140*a*. As used in this disclosure, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft, an eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described in this disclosure, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, the system 100 includes one or more chargers 104. For instance, and without limitation, system 100 may include a plurality of chargers, such as chargers 104*a-b*. For example, and without limitation, system 100 may include a first charger 104*a* and/or a second charger 104*b*. As used in this disclosure, a "charger" (also referred to in this disclosure as an "electric charger" or "electric aircraft charger") is a device capable of delivering electrical power to an energy source. Charger 104 may include a recharging station. In some embodiments, charger 104 may include a charging connector, which may mechanically connect to a component of electric aircraft 140, such as an electric aircraft port of electric aircraft 140. Charger 104 may be configured to supply power to electric aircraft 140. In some embodiments, charger 104 may be configured to deliver a voltage and/or current to the electric aircraft. In some embodiments, charger 104 may be configured to deliver 240V to the electric aircraft. In some embodiments, charger 104 may be configured to deliver 50 A to electric aircraft. In some embodiments, charger 104 may include power supply circuitry. Power supply circuitry may include a plurality of electrical components, such as, but not limited to, resistors, capacitors, inductors, transistors, transformers, integrated circuit chips, and the like. In some embodiments, charger 104 may be a fast charger, smart charger, trickle charger, etc., or any combination of the like. A "fast charger," for the purposes of this disclosure, is a charger that allows a battery to be charged in a fraction of the time it takes to do it the standard way, using a three-prong, 220 Volt (V) plug. Fast charging can be achieved by boosting the amperage or varying the voltage in order to increase the amount of potential energy. "Trickle charger" for the purposes of this disclosure, refer to the charger that uses the process of charging a fully charged battery at a rate equal to its self-discharge rate, thus enabling the battery to remain at its fully charged level. In a non-limiting embodiment, the state of fully charged occurs almost exclusively when the battery is not loaded, as trickle charging will not keep a battery charged if current is being drawn by a load, which may include, but not limited to, a battery of an electric aircraft, supplemental storage unit of an electric grid, and the like. Charger 104 may also include bidirectional charging capabilities. "Bidirectional charging," for the purposes of this disclosure, is a process whereby a charger is used to supply power from an electric aircraft's battery or an electric vehicle recharging component's battery to an energy source at a charger and/or to an electric grid; this may be performed via a direct current (DC) to alternating current (AC) converter system embedded in the electric vehicle recharging component and/or in the charger. As used in this disclosure, "energy source" is configured to power at least a portion of an electric aircraft and can include, without limitation, a cell. Energy source may include, without limitation, a generator, a photovoltaic device, a battery cell, a fuel cell such as a hydrogen fuel cell, direct methanol fuel cell, and/or solid oxide fuel cell, or an electric energy storage device; electric energy storage device may include without limitation a capacitor and/or a battery. A person of skill in the art will appreciate that energy source may be designed as to meet the energy or power requirement of various electric vehicles. A person of ordinary skill in the art will further appreciate that energy source can be designed to fit within a designated footprint on the various electric aircrafts. In one or more embodiments, charger 104 may also be configured to power various systems and hardware of electric aircraft 140, such as battery cooling systems, cabin cooling, and the like. In some embodiments, some systems of electric aircraft 140 may be powered only when electric aircraft 140 is connected and receiving power from charger 104.

Still referring to FIG. 1, system 100 may include a computing device 112. In various embodiments, each charger 104 may be communicatively connected to computing device. In some embodiments, charger 104 may include computing device 104. A computing device 104 may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. System 100 may include a single computing device 104 operating independently, or may include two or more computing device operating in concert, in parallel, sequentially or the like; two or more computing devices may be included together in a single computing device or in two or more computing devices. System 100 may interface or communicate with one or more additional devices as described below in further detail via a network interface device. Network interface device may be utilized for connecting system 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. System 100 may include but is not limited to, for example, a computing device or cluster of computing devices in a first location and a second computing device or cluster of computing devices in a second location. System 100 may include one or more computing devices dedicated to data storage, security, distribution of traffic for load balancing, and the like. System 100 may distribute one or more computing tasks as described below across a plurality of computing devices of system 100, which may operate in parallel, in series, redundantly, or in any other manner used for distribution of tasks or memory between computing devices. System 100 may be implemented using a "shared nothing" architecture in which data is cached at the worker, in an embodiment, this may enable scalability of system 100.

With continued reference to FIG. 1, system 100 may be designed and/or configured to perform any method, method step, or sequence of method steps in any embodiment described in this disclosure, in any order and with any degree of repetition. For instance, system 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. System 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 may include at least a processor 108 and a memory 110 communicatively connected to the at least a processor 108. "Communicatively connected" as used in this disclosure is an attribute of a connection, attachment or linkage between two or more relata which allows for reception and/or transmittance of information therebetween. Processor 108 and/or memory 110 may be installed on a first electric charger. In some embodiments, memory 110 may include instructions that may configure the at least a processor 108 to perform various tasks. Instructions may be received from, but not limited to, an external computing device, user input, and the like. In one or more embodiments, system 100 may be communicatively connected to and/or include one or more networking components, such as first networking component 120a and second networking component 120b. In one or more embodiments, system 100 may be communicatively connected to a first networking component 120a. A "first networking component", as used in this disclosure, is a device capable of transmitting and receiving electromagnetic waves. First networking component 120a may include one or more antennas, such as, but not limited to, isotropic antennas, dipole antennas, monopole antennas, antenna arras, loop antennas, conical antennas, aperture antennas, traveling-wave antennas, and/or other antennas. First networking component 120a may include transmitter, receivers, transceivers, signal modulators, and the like. First networking component may be capable of unidirectional or bidirectional communication. First networking component

120a may be configured to operate on a variety of suitable electromagnetic frequencies, such as, but not limited to, between 3 kHz to 300 GHz. In some embodiments, first networking component 120a may be configured to transmit and receive cellular signals, such as, but not limited to, 1G, 2G, 3G, 4G, LTE, 5G, and and/or other cellular bands and/or frequencies. In some embodiments, first networking component 120a may be installed on first charger 104a.

Still referring to FIG. 1, system 100 may include networking components 120, such as first networking component 120a and/or second networking component 120b. First networking component 120a may be configured to establish communicative connection 128 with a network 116. More specifically, first networking component 120a may establish a communicative connection 128 with a second networking component 120b via network 116. In one or more embodiments, system 100 may include a communication network 116, which networking components may communicate through, as discussed further below in FIG. 2. Networking components 120 may be communicatively connected via a communicative connection 128. Communicative connection 128 may include a communication channel. A "communication channel" as used in this disclosure is a bandwidth and/or frequency at which data transmission takes place. Communicative connection 128 may include bandwidths between about 25 MHz to 300 GHz. In some embodiments, communicative connection 128 may include, but is not limited to, bandwidths of 25 MHz, 100 MHz, 30 GHz, and/or 300 GHz. Communicative connection 128 may include, but is not limited to, frequencies of about between 3 kHz to 300 GHz. In some embodiments, communicative connection 128 may include a signal strength. Communicative connection 128 may include, but is not limited to, a signal strength of about −30 dBm to −110 dBm. In some embodiments, first networking component 120a may be configured to establish two or more communicative connections. First networking component 120a may be configured to establish one or more subchannels of communicative connection 128. A "subchannel" as used in this disclosure is a minor bandwidth encompassed by a major bandwidth. As a non-limiting example, communicative connection 128 may include a bandwidth of 100 MHz. A subchannel of communicative connection 128 may include a bandwidth of 80 MHz. In some embodiments, first networking component 120a may establish one or more subchannels configured to communicate with one or more other networking components, such as second networking component 120b.

Still referring to FIG. 1, processor 108 may be configured to adjust a bandwidth and/or frequency of communicative connection 128 through first networking component 120a. As a nonlimiting example, first networking component 120a may be operating communicative connection 128 at 5 GHz, but system 100 may determine a more stable communicative connection 128 may be established at 6.4 GHz. Processor 108 may adjust a bandwidth of communicative connection 128 through first networking component 120 from 5 GHz to 6.4 GHz. Processor 108 may utilize a communication machine-learning model to select and/or detect a node. A communication machine learning model may be trained on training data correlating communication metrics to communication criterion and/or communicative connections. Training data may be received from user input, external computing devices, and/or previous iterations of processing. A communication machine-learning model may be configured to input communication metrics and output communication criterion, which may improve accuracy of communication criterion that may be required to be met to establish communicative connection 128. In some embodiments, a communication machine learning model may be configured to input communication metrics and output communicative connections, which may increase data transmission efficiency between networking components. As a non-limiting example, a communication machine learning model may determine that at a range of 500 ft, a relative speed of 80 mph, and an altitude of 15,000 ft, a communicative connection operating at a bandwidth of 2.4 GHz may be superior to other bandwidths.

Still referring to FIG. 1, system 100 includes one or more sensors 144. For example, and without limitation, system 100 may include a plurality of sensors, such as first sensor 144*a* and second sensor 144*b*. Sensors 144 may be incorporated into various devices and systems of system 100, such as, for example, chargers, electric aircraft, and the like. Sensors may be in communication with networking components. In some nonlimiting embodiments, sensors 144 may be incorporated into chargers 104. For instance, and without limitation, a first sensor 144*a* may be connected to a first charger 104*a* and, in some embodiments, at least a second sensor 144*b* may be connected to at least a second charger 104*b*. In another instance, sensor 144 may be remote to chargers 104. In other embodiments, sensor 144 may be integrated into a module monitor unit within a battery pack of an electrical aircraft in communication and/or connected to with one or more chargers 104. As used in this disclosure, a "sensor" is a device, module, and/or subsystem, utilizing any hardware, software, and/or any combination thereof to sense a characteristic, a phenomenon, and/or changes thereof, in an instant environment; sensor may convert sensed phenomena into electrical signals. In one or more embodiments, sensor 144 may include a sensor suite. The sensor suite may be configured to capture a plurality of data. For example, in a non-limiting embodiment, sensor suite may include a plurality of voltmeters, temperature sensors, and the like. Temperature sensors may include, thermocouples, thermistors, thermometers, infrared sensors, resistance temperature sensors, and the like. In one or more nonlimiting embodiments, sensor may transduce a detected phenomenon, such as without limitation, voltage, current, speed, direction, force, torque, temperature, pressure, moisture, and the like, into a sensed signal. Sensor may include one or more sensors which may be the same, similar or different. Sensor may include a plurality of sensors which may be the same, similar or different. Sensor may include one or more sensor suites with sensors in each sensor suite being the same, similar or different. A sensor may include any number of suitable sensors such as, but not limited to, an electrical sensor, an imaging sensor, such as a camera or infrared sensor, a motion sensor, an inertia measurement unit (IMU), a radio frequency sensor, a light detection and ranging (LIDAR) sensor, an orientation sensor, a temperature sensor, a humidity sensor, or the like. Processor 108 may be in communicative communication with one or more sensors.

Still referring to FIG. 1, in one or more embodiments, sensor 144 may be configured to detect a charger metric 148. For the purposes of this disclosure, a "charger metric" is a measurement detected by a sensor related to a parameter or characteristic of a charger. For example, and without limitation, charger metric 148 may include a rate of charge, a voltage output, a current out, a number of uses (i.e. quantity of aircraft that have been charged by charger over a specific amount of time), duration of use (i.e. duration of time required to charge a battery to a particular SOC), and the like. In various embodiments, charger metric 148 may include a battery metric. As used in this disclosure, a "battery metric" is a measurement detected by a sensor related to a power source, or battery, of a charger. Battery metric includes, but is not limited to, an electrical parameter and a battery health parameter of a battery used as an energy source in one or more of the plurality of chargers, such as first charger 104*a* and/or second charger 104*b*. As used in this disclosure, an "electrical parameter" is a measurable electrical value or phenomenon that characterizes the behavior of electronic circuits, components, or semiconductors. Electrical parameters may include, without limitation, state of charge, potential, voltage, current, and/or impedance of the energy source. State of charge (SOC) is the level of power stored within the energy source. As used in this disclosure, a "battery health parameter" is a measurable value that characterizes state of health of an energy source. In one or more embodiments, battery metric may include one or more elements of data that relates to the state of health (SoH) of the energy source. For the purposes of this disclosure, "state of health" is a figure of merit of the condition of a battery (or a cell, or a battery pack), compared to its ideal conditions. The units of SoH are percent points (100%=the battery's conditions match the battery's specifications). Typically, a battery's SoH will be 100% at the time of manufacture and will decrease over time and use. However, a battery's performance at the time of manufacture may not meet its specifications, in which case its initial SoH will be less than 100%. In exemplary embodiments, one or more elements of system 100 including but not limited to computing device 112 may evaluate state of health of the portion of battery corresponding to health datum. Health datum may be compared to a threshold health datum corresponding to the parameter detected to generate said health datum. Health datum may be utilized to determine, by computing device 112, the suitability of battery module to a given application, such as aircraft flight envelope, mission, cargo capacity, speed, maneuvers, or the like. Health datum may include a useful life estimate corresponding to the at least a battery module. For the purposes of this disclosure, a "useful life estimate" is one or more elements of data indicating a remaining usability of one or more elements of an energy storage device, wherein the usability is a function of whether or not the one or more energy storage elements may be used in performing their designed functions. Useful life estimate may include one or more elements of data related to the remaining use of the battery module. Useful life estimate may include a time limit, usage limit, amperage per time parameter, electric parameter, internal resistance, impedance, conductance, capacity, voltage, self-discharge, ability to accept a charge, number of charge-discharge cycles, age of battery, temperature of battery during previous uses, current or future temperature limitations, total energy charged, total energy discharge, or predictions of failures corresponding to the battery module.

Still referring to FIG. 1, and in one or more embodiments, battery health parameter may include at least cell failure detection in any battery being sensed, monitored, charged, and/or discharged. In this case, sensor 144 may be configured to detect gas that may be emitted during or after cell failure. "Cell failure," for the purposes of this disclosure, refers to a malfunction of a battery cell, which may be an electrochemical cell, which renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further, sensor 144 configured to detect vent gas from electrochemical cells may include a gas detector. For the purposes of this disclosure, a "gas detector" is a device used to detect a gas is present in an area. Gas detectors, and more specifically, the gas sensor that may be used in sensor 144, may be configured to detect combustible, flammable, toxic, oxygen depleted, a combination thereof, or another type of gas alone or in combination. The gas sensor that may be present in sensor 144 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor 144 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sensor 144 may include sensors that are configured to detect non-gaseous byproducts of cell failure including, in non-limiting examples, electrical anomalies as detected by any of the previous disclosed sensors or components.

With continued reference to FIG. 1, the computing device 112 is configured to select data of the plurality of metrics, such as charger metrics 148, and utilize the data to determine a charger status 152. Charger status 152 may be determined for any charger 104 on network 116. As used in this disclosure, "charger status" is an element of data that represents an operating status of at least a portion of charger 104. Charger status 152 may include a charge time remaining estimate. For the purposes of this disclosure, a "charge time remaining" is a duration of time required to charge a power source to a desired amount of energy. Estimate may be calculated using computing device 112 and various battery metrics mentioned above. Charger status 152 may also include, without limitation, whether the charger 104 is connected to a battery, whether the charger 104 is currently charging a battery, the state of charge, the state of health, and the like. As a non-limiting example, charger status 152 may be "in use" if a sensor 104 detects that current is flowing from the charger. As another non-limiting example, charger status 152 may include "out of order" if a defect is detected charger 104; for example, a charger 104 may have a short if the current flowing through charger 104 exceeds a threshold current value, or if the voltage falls below a threshold voltage level.

Still referring to FIG. 1, computing device 112 is configured to determine a charge cycle as a function of a machine-learning model. "Charge cycle," for the purposes of this disclosure, refer to a process of recharging and discharging an electric energy source as required into a load which may include, but not limited to, a battery of an electric aircraft, supplemental storage unit of an electric grid, and the like. The charge cycle may be determined as a function of a machine-learning model wherein the machine-learning model may receive a set of training data including, but not limited to, rate of a charge cycle of an electric grid, rate of charge of an electric vehicle, and rate of charge of an electric vehicle recharging component, and train the set with a classification of failure modes to determine the charge cycle to recharge an electric grid when a computing device detects a failure of the electric grid. Once a charge level is set, charger 104 may automatically turn off and on to maintain a specified charge range.

Still referring to FIG. 1, sensor 144 may detect an aircraft metric. For the purposes of this disclosure, and "aircraft metric" is a measurement of one or more parameters or characteristics of an electric aircraft in electrical communication with a charger. Charger 104 may provide electrical power to a battery pack of an electric aircraft that in connected to charger during charging. Electric aircraft battery pack may include a battery module, which may be configured to provide energy to an electric aircraft via a power supply connection. For the purposes of this disclosure, a "power supply connection" is an electrical and/or physical communication between a battery module and electric aircraft that powers electric aircraft and/or electric aircraft subsystems for operation. In one or more embodiments, electric aircraft battery pack may include a plurality of battery modules. For example, and without limitation, battery pack may include fourteen battery modules. In one or more embodiments, each battery module may include a battery cell. For example, and without limitation, battery module may include a plurality of battery cells. In one or more embodiments, aircraft metric may include measurements of a current SOC of electric aircraft battery pack, power source type, and the like. For instance, and without limitation, aircraft metric may include specifications of electric aircraft (e.g., make, model, years of operation, engine type, propulsor type, geographical or physical location, charging status, and the like), which may be received from sensor 144 or from a database of the network. In one or more nonlimiting embodiments, aircraft metric may include battery health data. Battery health data may include, but is not limited to, battery capacity, battery age, battery efficiency, and the like. In some embodiments, aircraft metric may include battery state of charge data. Battery state of charge data may include a percent and/or ratio of a level of charge of a battery compared to a full capacity of the battery. As a nonlimiting example, battery state of charge data may show 20%, 30%, 60%, 90% charge and the like. Aircraft metric may include battery temperature data, aircraft health data, aircraft damage data, and the like. In some embodiments, aircraft metric may include flight plans, such as, but not limited to, departure times, destinations, arrival times, and the like. aircraft metric may include flight paths, flight trajectories, and the like. Aircraft metric may include flight component health, such as but not limited to rotor health, tail health, propulsor health, motor health, landing gear health, and the like. In some embodiments, aircraft metric may include fleet manager data, remote pilot data, and the like.

Still referring to FIG. 1, sensor 144 of system 100 may be configured to detect a communication metric. A "communication metric", as used in this disclosure, is information pertaining to a signal transmission, such as a signal transmission by a first networking component. A communication metric may include, but is not limited to, transmission speed, error rate, signal strength, physical location, signal-noise ratio, charger operation status (e.g., in use, not in use, out of service, and the like), authentication, and the like. In some embodiments, processor 108 may be configured to determine a communication metric relative to chargers 104.

Still referring to FIG. 1, processor 108 may be configured to activate first networking component 120a as a function of Communication criterion 156. A "communication criterion", as used in this disclosure, is a value of a parameter required for transmission of a signal. Communication criterion 156 may include a distance between charger 104 and a networking component of another device or system, such as a base tower, electric aircraft, another charger, and the like. Communication criterion 156 may be received at processor 108 from user input, an external computing device, and/or previous iterations of communication. Processor 108 may compare one or more communication metrics to one or more Communication criterion 156. For instance, and without limitation, processor 108 may determine that a detected communication metric of a charger or aircraft with particular certification and/or identification meets a communication criterion of necessary authentication and security requirements and may activate first networking component 120*a* to establish communicative connection 128.

Still referring to FIG. 1, system 100 may compare Communication criterion 156 to a communication metric using an optimization criterion. An "optimization criterion" as used in this disclosure is a value that is sought to be maximized or minimized in a system. System 100 may use an objective function to compare Communication criterion 156 to a communication metric. An "objective function" as used in this disclosure is a process of minimizing or maximizing one or more values based on a set of constraints. System 100 may generate an objective function to optimize a communicative connection of an electric aircraft. In some embodiments, an objective function of system 100 may include an optimization criterion. An optimization criterion may include any description of a desired value or range of values for one or more attributes of a flight; desired value or range of values may include a maximal or minimal value, a range between maximal or minimal values, or an instruction to maximize or minimize an attribute. As a non-limiting example, an optimization criterion may specify that a range of transmission should be at least 10 meters; an optimization criterion may cap a range of transmission, for instance specifying that a range of transmission must not have a range greater than a specified value. An optimization criterion may alternatively request that a communication metric be greater than a certain value. An optimization criterion may specify one or more tolerances for ranges of transmission. An optimization criterion may specify one or more desired communication metrics of a communicative connection, such as, but not limited to, distance, altitude, velocity, bandwidth, and the like. In an embodiment, an optimization criterion may assign weights to different attributes or values associated with attributes; weights, as used herein, may be multipliers or other scalar numbers reflecting a relative importance of a particular attribute or value. One or more weights may be expressions of value to a user of a particular outcome, attribute value, or other facet of a communication metric; value may be expressed, as a non-limiting example, in remunerative form, such as a cost of transmission, a quickest communication time, and the like. As a non-limiting example, minimization of channel establishment may be multiplied by a first weight, while tolerance above a certain value may be multiplied by a second weight. Optimization criteria may be combined in weighted or unweighted combinations into a function reflecting an overall outcome desired by a user; function may be a fuel function to be minimized and/or maximized. Function may be defined by reference to communication metric constraints and/or weighted aggregation thereof as provided by system 100; for instance, a range function combining optimization criteria may seek to minimize or maximize a function of altitude.

Still referring to FIG. 1, system 100 may use an objective function to compare communication criterion 156 with a communication metric. Generation of an objective function may include generation of a function to score and weight factors to achieve a process score for each feasible pairing. In some embodiments, pairings may be scored in a matrix for optimization, where columns represent communication criterion data and rows represent optimal communication metrics potentially paired therewith; each cell of such a matrix may represent a score of a pairing of the corresponding communication criterion to the corresponding optimal communication metric. In some embodiments, assigning a predicted process that optimizes the objective function includes performing a greedy algorithm process. A "greedy algorithm" is defined as an algorithm that selects locally optimal choices, which may or may not generate a globally optimal solution. For instance, system 100 may select pairings so that scores associated therewith are the best score for each order and/or for each communication metric. In such an example, optimization may determine the combination of communication metrics such that each object pairing includes the highest score possible.

Still referring to FIG. 1, an objective function may be formulated as a linear objective function. System 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r\in R}\Sigma_{s\in S}c_{rs}x_{rs}$, where R is a set of all communication criterion r, S is a set of all optimal communication metrics s, $c_{rs}$ is a score of a pairing of a given communication criterion with a given optimal communication metric, and $x_{rs}$ is 1 if a communication criterion r is paired with a communication metric s, and 0 otherwise. Continuing the example, constraints may specify that each communication criterion is assigned to only one optimal communication metric, and each optimal communication metric is assigned only one communication criterion. Optimal communication metrics may include optimal communication metrics as described above. Sets of optimal communication metrics may be optimized for a maximum score combination of all generated optimal communication metrics. In various embodiments, system 100 may determine a combination of optimal communication metrics that maximizes a total score subject to a constraint that all communication criterion are paired to exactly one optimal communication metric. Not all optimal communication metrics may receive a communication metric pairing since each optimal communication metric may only produce one communication criterion. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on processor 108 of system 100 and/or another device of system 100, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, system 100 may assign variables relating to a set of parameters, which may correspond to score communication metrics as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of data loss. Objectives may include minimization of channel quantity. Objectives may include minimization of ping times. Objectives may include minimization of differences between a communication metric and measured communication metric.

Still referring to FIG. 1, system 100 may use a fuzzy inferential system to determine an initial recipient node. "Fuzzy inference" is the process of formulating a mapping from a given input to an output using fuzzy logic. "Fuzzy logic" is a form of many-valued logic in which the truth value of variables may be any real number between 0 and 1. Fuzzy logic may be employed to handle the concept of partial truth, where the truth value may range between completely true and completely false. The mapping of a given input to an output using fuzzy logic may provide a basis from which decisions may be made and/or patterns discerned. A first fuzzy set may be represented, without limitation, according to a first membership function representing a probability that an input falling on a first range of values is a member of the first fuzzy set, where the first membership function has values on a range of probabilities such as without limitation the interval [0,1], and an area beneath the first membership function may represent a set of values within the first fuzzy set. A first membership function may include any suitable function mapping a first range to a probability interval, including without limitation a triangular function defined by two linear elements such as line segments or planes that intersect at or below the top of the probability interval.

Still referring to FIG. 1, a first fuzzy set may represent any value or combination of values as described above, including communication metrics. A second fuzzy set, which may represent any value which may be represented by first fuzzy set, may be defined by a second membership function on a second range; second range may be identical and/or overlap with first range and/or may be combined with first range via Cartesian product or the like to generate a mapping permitting evaluation overlap of first fuzzy set and second fuzzy set. Where first fuzzy set and second fuzzy set have a region that overlaps, first membership function and second membership function may intersect at a point representing a probability, as defined on probability interval, of a match between first fuzzy set and second fuzzy set. Alternatively or additionally, a single value of first and/or second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of match between a first fuzzy set and a second fuzzy set, and/or single values therein with each other or with either set, which is sufficient for purposes of the matching process. In some embodiments, there may be multiple thresholds. Each threshold may be established by one or more user inputs. Alternatively or additionally, each threshold may be tuned by a machine-learning and/or statistical process, for instance and without limitation as described in further detail below.

Still referring to FIG. 1, system 100 may be configured to detect a node suitable for communicative connection 128. In some embodiments, system 100 may be configured to detect a communicative connection of a network node 132. A "network node" as used in this disclosure is a device capable of sending and receiving data via a network. Network node 132 may include a computing device of an entity. An "entity" as used in this disclosure is an individual or machine at an altitude of ground level. An entity may include, but is not limited to, a control tower, base, and the like, as previously described in FIG. 1. Network node 132 may be configured to operate on any bandwidths and/or frequencies as described throughout this disclosure, such as, but not limited to, radio, cellular, Wi-Fi, and the like.

Still referring to FIG. 1, charger 104 may communicate metrics, such as charger metrics 148, through system 100 with a second networking component 120b. A "second networking component", as used in this disclosure, is a device capable of sending and receiving data. Second networking component 120b may include, but is not limited to, a networking component of an aircraft, smartphone, tablet, desktop, base tower, another charger (e.g., second charger 104b), a stakeholder, and the like. In some embodiments, system 100 may communicate metrics with one or more external aircraft through network node 132. In various embodiments, system 100 may send a communication to second networking component 120b as a function of Communication criterion 156 as described above.

With continued reference to FIG. 1, in some embodiments, computing device 112 may communicate data over network 116 to one or more networking nodes 132 or device. As a non-limiting example, data may be communicated to second charger 104b. As a non-limiting example, data may be communicated to a remote device as disclosed below. As a non-limiting example, data may be communicated to a database 160 as disclosed below. Data may include any suitable data discussed in this disclosure including, but not limited to charger metric 148, battery metric, aircraft metric, charger status 152, and the like.

With continued reference to FIG. 1, in some embodiments, system 100 may include a database 160. Database 160 may be communicatively connected to network 116. In some embodiments, database 160 may communicatively connect to networking node 132. Database 160 may be implemented, without limitation, as a relational database, a key-value retrieval database such as a NOSQL database, or any other format or structure for use as a database that a person skilled in the art would recognize as suitable upon review of the entirety of this disclosure. Database 160 may alternatively or additionally be implemented using a distributed data storage protocol and/or data structure, such as a distributed hash table or the like. Database 160 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 160 may receive charger metric 148, battery metric, charger status 152, and the like, using network 116. Database 160 may be configured to store data, such as, as non-limiting examples, charger metric 148, battery metric, charger status 152, and the like.

With continued reference to FIG. 1, in some embodiments, database 160 may communicate data relating to charger 104, such as non-limiting examples, charger metric 148, battery metric, charger status 152, and the like, to one or more users. Users may include, pilots, dispatchers, fleet managers, charging system owners, aircraft owners, power companies, and the like. In some embodiments, database 160 may communicate data to one or more remote devices. For the purposes of this disclosure, a "remote device," is a device that is located remote to database 160. Remote device may include, for non-limiting examples, computers, laptops, desktops, smartphones, smartwatches, wearables, tablets, and the like.

Figure 2:
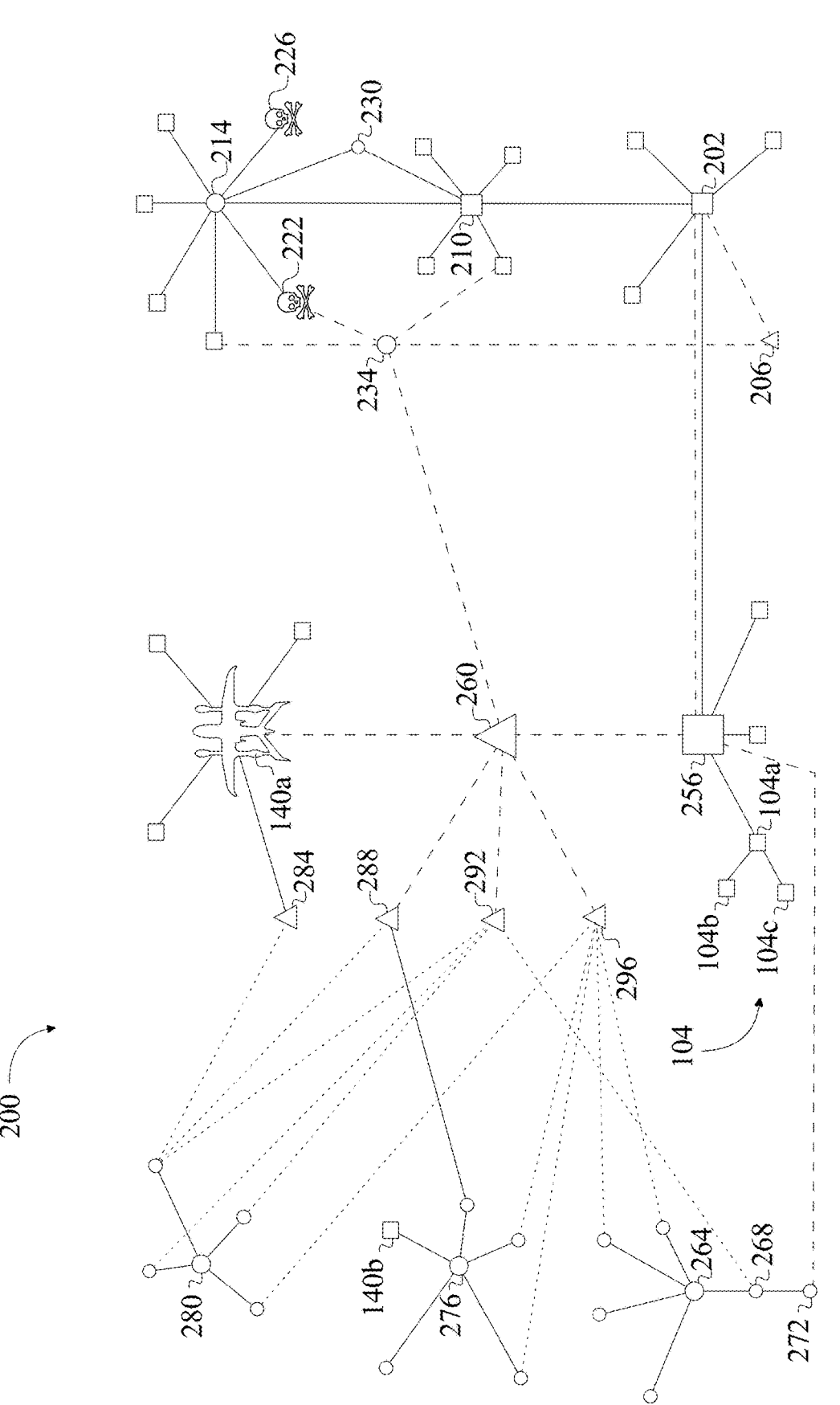
FIG. 2 is a diagram of an exemplary embodiment of a communication network in accordance with one or more embodiments of the present disclosure.

Now referring to FIG. 2, an exemplary embodiment of a network of a communication network 200. Aspects of communication network 200 may be consistent network 116, discussed with reference to FIG. 1. For the purpose of this disclosure, a "communication network" is an arrangement of interconnected devices or systems that facilitates an exchange of information or data between the systems or devices. In various embodiments, communication network may use various types of network nodes (e.g., systems or devices) to facilitate communication. In various embodiments, devices and/or systems may be communicatively connected using communication network. For instance, and without limitation, communication network 116 may facilitate communication between a plurality of chargers 104, as previously mentioned. Furthermore, and in nonlimiting embodiments, communication network 116 may facilitate communication between charger 104 and electric aircraft 140. In some embodiments, communication network 116 may facilitate communication to and/or between chargers 104a, 104b, 104c, and hardware 260. In some embodiments, communication network 116 may facilitate communication to and/or between chargers 104a, 104b, 104c, and fleet customer nodes 280. For instance, and without limitation, charger 104 may be communicatively connected to hardware 256 (e.g., battery, port, and the like) or software 260 (e.g., system monitoring) of electric aircraft 140. In various other nonlimiting embodiments, charger 104 may be communicatively connected to other nodes or networking components of communication network, such as airport 264 (e.g., owners, ATC, facilities, FBO, construction contractors 268, construction regulators 272, and the like). Providing data and/or metrics to airport 264 may allow for airports to properly modify or maintain facilities based on detected needs of chargers and electric aircraft using such chargers. For instance, and without limitation, charger 104 may share information with an airport 264 showing that aircraft needs a certain amount of time to charge prior to flying again, thus, traffic may be directed accordingly to avoid a back up of aircraft waiting to be charger. In other nonlimiting embodiments, charger 194 may be communicatively connected to fleet customer nodes 280 (e.g., planners, A&P mechanics, pilots of aircraft 104, ground crew, and the like). In various other nonlimiting embodiments, charger 104 may be communicatively connected to other customers nodes 276 (e.g., warehouses, ground logistics, ecommerce sellers, other pilots, other aircraft, and the like). In one or more embodiments, nodes 264, 276, and 280 may be communicatively connected to various other components of aircraft 140, such as for example, avionics UI 284, foreflight/EFB mobile overlay 288, Mobile UI 292, a backoffice 296, and the like. In one or more embodiments, charger 104 may provide data and/or metrics related to micro grids 202 (e.g., V2G HW, local solar, load shedding logic 206, and local storage, and the like), distribution 210 (e.g., grid storage, transformers, metering, lies, PUC 230, and the like), and generation 214 (e.g., gas carbon 222, coal carbon 226, wind, solar, hydro, nuclear, and the like). For instance, and without limitation, a charger metric, which is discussed further below in this disclosure, may include measurements of a direct or indirect use of wind, solar, or other sources of power generation, to determine an environmental footprint of chargers 104. Furthermore, information related to a demand market response 234 may be monitored to determine energy values. For example, and without limitation, a current currency amount (e.g., in dollars) may be monitored to see how much a charge per aircraft is. Similarly, and overall earning of a charger may be monitored to see if a charger in a specific geographic location is worth keeping in operation (e.g., worth or earnings per year of a particular charger). This may allow owners of chargers 104 to determine if rates of chargers should be lowered or raised based on amount of use as well.

Still referring to FIG. 2, in some embodiments, communication network 200 may include, participate in, and/or be incorporated in a network topology. A "network topology" as used in this disclosure is an arrangement of elements of a communication network, such as network 116 (shown in FIG. 1). In some embodiments, communication network 200 may include, but is not limited to, a star network, tree network, and/or a mesh network. A "mesh network", as used in this disclosure, is a local network topology in which the infrastructure nodes connect directly, dynamically, and non-hierarchically to as many other nodes as possible. Communication network 200 may be configured to communicate in a partial mesh network. A partial mesh network may include a communication system in which some nodes may be connected directly to one another while other nodes may need to connect to at least another node to reach a third node. In some embodiments, communication network 200 may be configured to communicate in a full mesh network. A full mesh network may include a communication system in which every node in the network may communicate directly to one another. In some embodiments, communication network 200 may be configured to communicate in a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no cross-talk between the two layers which advantageously provides a redundancy and safeguard in the event of a disruption in the operation of one of the layers. A layer may be an abstraction which is not tangible. In some embodiments, communication network 200 may be configured to communicate in and/or with a mesh network as described in U.S. patent application Ser. No. 17/478,067, filed Sep. 17, 2021, and titled "SYSTEM FOR A MESH NETWORK FOR USE IN AIRCRAFTS", of which is incorporated by reference herein in its entirety.

Still referring to FIG. 2, radio communication, in accordance with embodiments, first networking component 120 may utilize at least a communication band and communication protocols suitable for aircraft radio communication. For example, and without limitation, a very-high-frequency (VHF) air band with frequencies between about 108 MHz and about 137 MHz may be utilized for radio communication. In another example, and without limitation, frequencies in the Gigahertz range may be utilized. Airband or aircraft band is the name for a group of frequencies in the VHF radio spectrum allocated to radio communication in civil aviation, sometimes also referred to as VHF, or phonetically as "Victor". Different sections of the band are used for radio-navigational aids and air traffic control. Radio communication protocols for aircraft are typically governed by the regulations of the Federal Aviation Authority (FAA) in the United States and by other regulatory authorities internationally. Radio communication protocols may employ, for example and without limitation an S band with frequencies in the range from about 2 GHz to about 4 GHz. For example, and without limitation, for 4G mobile network communication frequency bands in the range of about 2 GHz to about 8 GHz may be utilized, and for 5G mobile network communication frequency bands in the ranges of about 450 MHz to about 6 GHz and of about 24 GHz to about 53 GHz may be utilized. Mobile network communication may utilize, for example and without limitation, a mobile network protocol that allows users to move from one network to another with the same IP address. In some embodiments, a network component 120 may be configured to transmit and/or receive a radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. A radio frequency (RF) transmission signal may compose an analogue and/or digital signal received and be transmitted using functionality of output power of radio frequency from a transmitter to an antenna, and/or any RF receiver. A RF transmission signal may use longwave transmitter device for transmission of signals. An RF transmission signal may include a variety of frequency ranges, wavelength ranges, ITU designations, and IEEE bands including HF, VHF, UHF, L, S, C, X, Ku, K, Ka, V, W, mm, among others.

Still referring to FIG. 2, satellite communication, in accordance with embodiments, may utilize at least a communication band and communication protocols suitable for aircraft satellite communication. For example, and without limitation, satellite communication bands may include L-band (1-2 GHz), C-band (4-8 GHz), X-band (8-12 GHz), Ku-band (12-18 GHz), Ku-band (12-18 GHz), and the like, among others. Satellite communication protocols may employ, for example and without limitation, a Secondary Surveillance Radar (SSR) system, automated dependent surveillance-broadcast (ADS-B) system, or the like. In SSR, radar stations may use radar to interrogate transponders attached to or contained in aircraft and receive information in response describing such information as aircraft identity, codes describing flight plans, codes describing destination, and the like SSR may utilize any suitable interrogation mode, including Mode S interrogation for generalized information. ADS-B may implement two communication protocols, ADS-B-Out and ADS-B-In. ADS-B-Out may transmit aircraft position and ADS-B-In may receive aircraft position. Radio communication equipment may include any equipment suitable to carry on communication via electromagnetic waves at a particular bandwidth or bandwidth range, for example and without limitation, a receiver, a transmitter, a transceiver, an antenna, an aerial, and the like, among others. A mobile or cellular network communication equipment may include any equipment suitable to carry on communication via electromagnetic waves at a particular bandwidth or bandwidth range, for example and without limitation, a cellular phone, a smart phone, a personal digital assistant (PDA), a tablet, an antenna, an aerial, and the like, among others. A satellite communication equipment may include any equipment suitable to carry on communication via electromagnetic waves at a particular bandwidth or bandwidth range, for example and without limitation, a satellite data unit, an amplifier, an antenna, an aerial, and the like, among others.

Still referring to FIG. 2, as used in this disclosure "bandwidth" is measured as the amount of data that can be transferred from one point or location to another in a specific amount of time. The points or locations may be within a given network. Typically, bandwidth is expressed as a bitrate and measured in bits per second (bps). In some instances, bandwidth may also indicate a range within a band of wavelengths, frequencies, or energies, for example and without limitation, a range of radio frequencies which is utilized for a particular communication.

Still referring to FIG. 2, as used in this disclosure "antenna" is a rod, wire, aerial or other device used to transmit or receive signals such as, without limitation, radio signals and the like. A "directional antenna" or beam antenna is an antenna which radiates or receives greater power in specific directions allowing increased performance and reduced interference from unwanted sources. Typical examples of directional antennas include the Yagi antenna, the log-periodic antenna, and the corner reflector antenna. The directional antenna may include a high-gain antenna (HGA) which is a directional antenna with a focused, narrow radio wave beamwidth and a low-gain antenna (LGA) which is an omnidirectional antenna with a broad radio wave beamwidth, as needed or desired.

With continued reference to FIG. 2, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 2, in some cases, processor 108 and/or first networking component 120a may perform one or more signal processing steps on a sensed characteristic. For instance, a processor 108 may analyze, modify, and/or synthesize a signal representative of characteristic in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 3:
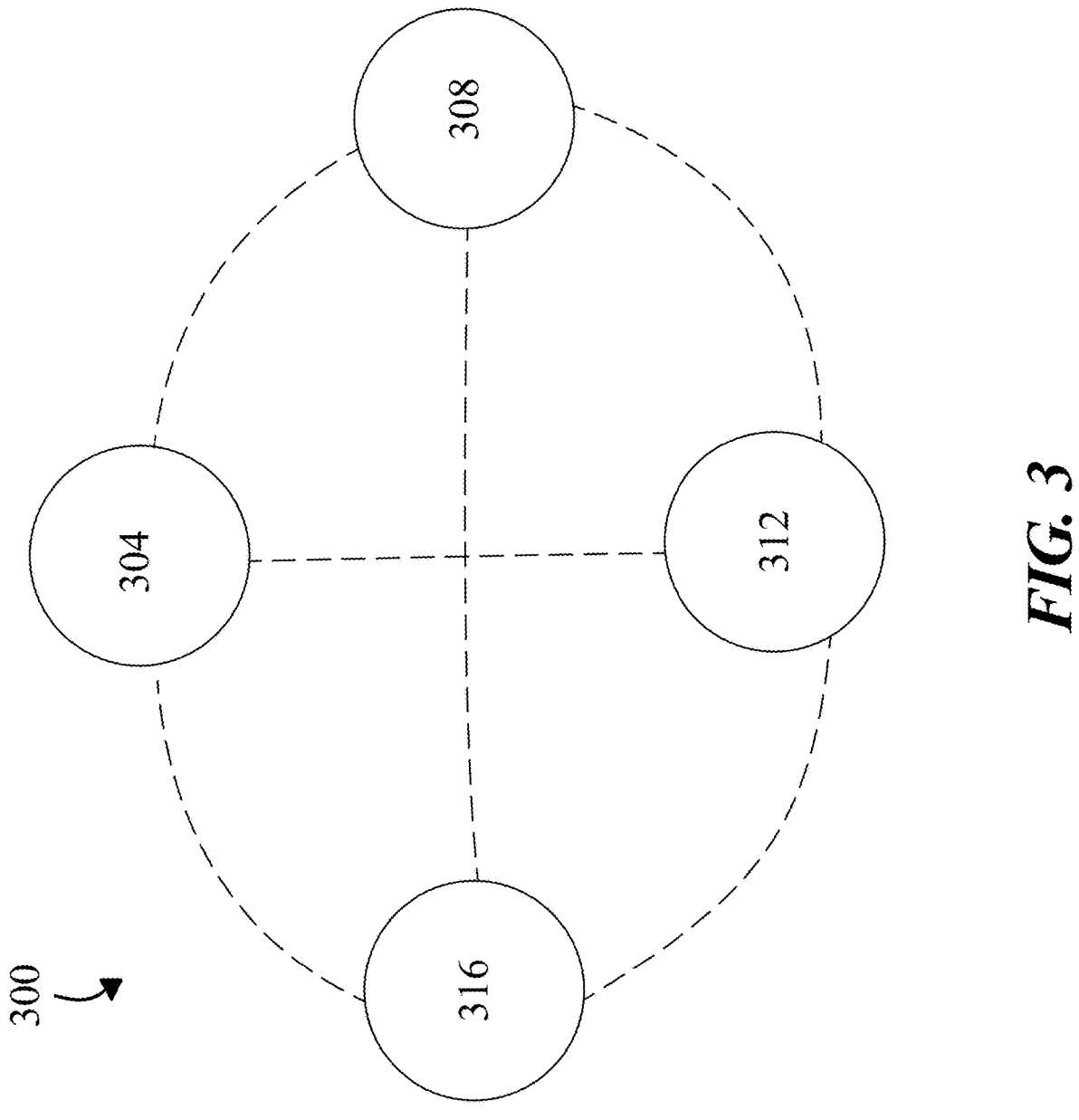
FIG. 3 is a diagram of an exemplary network.

Now referring to FIG. 3, a block diagram of a system for a network 300 (e.g., mesh network) for an electric aircraft is shown. Node 304 may be designed and/or configured to perform any method, method step, or sequence of method steps in any embodiment described in this disclosure, in any order and with any degree of repetition. For instance, node 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Node 304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 3, system 300 may include a plurality of nodes. In some embodiments, system 300 may include and/or communicate with a second node 308. In some embodiments, system 300 may include and/or communicate with a third node 312. In some embodiments, system 300 may include and/or communicate with a fourth node 316. A "node" as used in this disclosure is a computing device that is configured to receive and transmit data to another computing device. A node may include any computing device, such as, but not limited to, an electric aircraft, a laptop, a smartphone, a tablet, a command deck, a recharging pad, and/or other computing devices. In some embodiments, node 304 may include a computing device of a charger management system. In some embodiments, node 304, second node 308, third node 312, and fourth node 316 may include a computing device 112 of a charger management system. In some embodiments, node 304 may be configured to transmit and receive data from second node 308, third node 312, and/or fourth node 316. In some embodiments, second node 308 may be configured to transmit and receive data from node 304, third node 312, and/or fourth node 316. In some embodiments, third node 312 may be configured to transmit and receive data from node 304, second node 308, and/or fourth node 316. In some embodiments, fourth node 316 may be configured to transmit and receive data from first node 304, second node 308, and/or third node 312. System 300 may include and/or communicate with a plurality of nodes greater than four nodes. In some embodiments, system 300 may include less than four nodes. A node of system 300 may be configured to communicate data to another node of system 300. Data may include, but is not limited to, flight path data, battery charge data, locational data, speed data, acceleration data, propulsor data, power data, and/or other data. In some embodiments, data may include communication efficiency feedback. "Communication efficiency feedback," as used in this disclosure, is any data concerning effectiveness of data transmission. In some embodiments, communication efficiency feedback may include, but is not limited to, signal strength, signal-noise ratio, error rate, availability of a higher-efficiency mode, physical trajectory of a second node, project change over time, relative strength of a third node, and the like. In some embodiments, system 300 may include and/or communicate with an initial recipient node. An "initial recipient node" as used in this disclosure is any node first transmitted to in a network. In some embodiments, first node 304 may include an initial recipient node. First node 304 may transmit data to second node 308. Second node 308 may transmit communication efficiency feedback to another node of system 300. In some embodiments, communication efficiency feedback may be based on data transmission times between two or more nodes. Communication efficiency feedback may be explicit. Explicit communication efficiency feedback may include second node 308 providing information to first node 304 about transmission times, error rates, signal-noise ratios, and the like. In some embodiments, second node 308 may provide communication efficiency feedback to first node 304 about one or more other nodes in system 300. Communication efficiency feedback about one or more other nodes of system 300 may include, but is not limited to, transmission speed, signal strength, error rate, signal-noise ratio, physical trajectory, availability, projected change over time, and the like. First node 304 may use communication efficiency feedback of second node 304 and/or one or more other nodes of system 300 to select an initial recipient node. Communication efficiency feedback may alternatively or additionally be implicit. Implicit communication efficiency feedback may include first node 304 detecting communication parameters such as, but not limited to, transmission speed, error rate, signal strength, physical trajectory, signal-noise ratio, and the like. First node 304 may determine one or more communication parameters based on a transmission between first node 304 and one or more other nodes of system 300. In some embodiments, first node 304 may store communication parameters of one or more other nodes. In a non-limiting example, first node 304 may store communication parameters of second node 304 which may include that second node 304 may have a high signal-noise ratio. First node 304 may search for another node of system 300 to select as an initial recipient node based on stored communication parameters of second node 308. In some embodiments, first node 304 may compare one or more communication parameters of a communication efficiency feedback of one or more nodes to select an initial recipient node. First node 304 may compare communication efficiency feedback to a communication threshold. A "communication threshold" as used in this disclosure is any minimum or maximum value of a communication metric. A communication threshold may include, but is not limited to, an error rate, a transmission speed, a signal-noise ratio, a physical trajectory, a signal strength, and the like. In some embodiments, first node 304 may receive data from second node 308 about a third node, fourth node, etc. Data about a third node, fourth node, etc. may include communication efficiency feedback. First node 304 may use data received from second node 308 about another node to select from a plurality of nodes of system 300. First node 304 may utilize a machine-learning model to predict an optimal communication pathway of nodes. A machine-learning model may be trained on training data correlating communication parameters to selected initial recipient nodes. Training data may be obtained from prior transmissions, stored data of one or more nodes, and/or received from an external computing device. In some embodiments, training data may be obtained from a user input. First node 304 may utilize a machine-learning model to compare one or more nodes based on one or more communication parameters for an optimal pathway selection. A machine-learning model may be as described below with reference to FIG. 5.

Still referring to FIG. 3, first node 304 may generate an objective function to compare communication parameters of two or more nodes. An "objective function" as used in this disclosure is a process of maximizing or minimizing one or more values based on a set of constraints. In some embodiments, an objective function of generated by first node 304 may include an optimization criterion. An optimization criterion may include any description of a desired value or of values for one or more attributes of a communication pathway; desired value or range of values may include a maximal or minimal value, a range between maximal or minimal values, or an instruction to maximize or minimize an attribute. As a non-limiting example, an optimization criterion of at least an optimization criterion may specify that a communication should have a fast transmission time; an optimization criterion may cap error rates of a transmission. An optimization criterion may specify one or more thresholds for communication parameters in transmission pathways. An optimization criterion may specify one or more desired physical trajectories for a communication pathway. In an embodiment, at least an optimization criterion may assign weights to different attributes or values associated with attributes; weights, as used herein, may be multipliers or other scalar numbers reflecting a relative importance of a particular attribute or value. As a non-limiting example, minimization of response time may be multiplied by a first weight, while a communication threshold above a certain value may be multiplied by a second weight. Optimization criteria may be combined in weighted or unweighted combinations into a function reflecting an overall outcome desired by a user; function may be a communication function to be minimized and/or maximized. Function may be defined by reference to communication constraints and/or weighted aggregation thereof; for instance, a communication function combining optimization criteria may seek to minimize or maximize a function of communication constraints.

Still referring to FIG. 3, first node 304 may use an objective function to compare second node 304 to one or more other nodes. Generation of an objective function may include generation of a function to score and weight factors to achieve a communication score for each feasible pairing. In some embodiments, pairings may be scored in a matrix for optimization, where columns represent nodes and rows represent communications potentially paired therewith; each cell of such a matrix may represent a score of a pairing of the corresponding node to the corresponding communication. In some embodiments, assigning a predicted process that optimizes the objective function includes performing a greedy algorithm process. A "greedy algorithm" is defined as an algorithm that selects locally optimal choices, which may or may not generate a globally optimal solution. For instance, first node 304 may select pairings so that scores associated therewith are the best score for each order and/or for each process. In such an example, optimization may determine the combination of processes such that each object pairing includes the highest score possible.

Still referring to FIG. 3, an objective function may be formulated as a linear objective function. First node 304 may solve objective function 344 using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all nodes r, S is a set of all communications s, $c_{rs}$ is a score of a pairing of a given node with a given communication, and $x_{rs}$ is 3 if a node r is paired with a communication s, and 0 otherwise. Continuing the example, constraints may specify that each node is assigned to only one communication, and each communication is assigned only one node. Communications may include communications and/or transmissions as described above. Sets of communications may be optimized for a maximum score combination of all generated communications. In various embodiments, first node 304 may determine a combination of nodes that maximizes a total score subject to a constraint that all nodes are paired to exactly one communication. In some embodiments, not all communications may receive a node pairing since each communication may only use one node. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on first node 304 and/or another device in system 300, and/or may be implemented on third-party solver.

With continued reference to FIG. 3, optimizing an objective function may include minimizing a loss function, where a "loss function" is an expression an output of which an optimization algorithm minimizes to generate an optimal result. As a non-limiting example, first node 304 may assign variables relating to a set of parameters, which may correspond to a score of communications as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of response times. Objectives may include minimization of error rate of transmission. Objectives may include minimization of nodes used. Objectives may include minimization of signal-noise ratio. Objectives may include minimization of physical trajectory.

Still referring to FIG. 3, first node 304 may use a fuzzy inferential system to determine an initial recipient node. "Fuzzy inference" is the process of formulating a mapping from a given input to an output using fuzzy logic. "Fuzzy logic" is a form of many-valued logic in which the truth value of variables may be any real number between 0 and 1. Fuzzy logic may be employed to handle the concept of partial truth, where the truth value may range between completely true and completely false. The mapping of a given input to an output using fuzzy logic may provide a basis from which decisions may be made and/or patterns discerned. A first fuzzy set may be represented, without limitation, according to a first membership function representing a probability that an input falling on a first range of values is a member of the first fuzzy set, where the first membership function has values on a range of probabilities such as without limitation the interval [0,1], and an area beneath the first membership function may represent a set of values within the first fuzzy set. A first membership function may include any suitable function mapping a first range to a probability interval, including without limitation a triangular function defined by two linear elements such as line segments or planes that intersect at or below the top of the probability interval.

Still referring to FIG. 3, a first fuzzy set may represent any value or combination of values as described above, including communication parameters. A second fuzzy set, which may represent any value which may be represented by first fuzzy set, may be defined by a second membership function on a second range; second range may be identical and/or overlap with first range and/or may be combined with first range via Cartesian product or the like to generate a mapping permitting evaluation overlap of first fuzzy set and second fuzzy set. Where first fuzzy set and second fuzzy set have a region that overlaps, first membership function and second membership function may intersect at a point representing a probability, as defined on probability interval, of a match between first fuzzy set and second fuzzy set. Alternatively or additionally, a single value of first and/or second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of match between a first fuzzy set and a second fuzzy set, and/or single values therein with each other or with either set, which is sufficient for purposes of the matching process. In some embodiments, there may be multiple thresholds. Each threshold may be established by one or more user inputs. Alternatively or additionally, each threshold may be tuned by a machine-learning and/or statistical process, for instance and without limitation as described in further detail below.

Still referring to FIG. 3, first node 304 may use a fuzzy inference system to determine a plurality of outputs based on a plurality of inputs. A plurality of outputs may include a communication efficiency of one or more nodes. A plurality of inputs may include communication efficiency feedback as described above. In a non-limiting example, first node 304 may detect that second node 308 may have slow response time and a far physical trajectory. First node 304 may determine, using fuzzy logic, that second node 308 is "too far" for selection as an initial recipient node. In another non-limiting example, first node 304 may detect that second node 308 may have a high transmission speed and a close physical trajectory. First node 304 may determine that second node 308 has a "strong signal".

Still referring to FIG. 3, first node 304 may determine a connectivity of a plurality of potential initial recipient nodes. First node 304 may determine, using any process described in this disclosure, an optimal initial recipient node according to a selection criteria. A selection criteria may include, but is not limited to, physical trajectory, projected change over time, signal strength, error rate, transmission speeds, response times, neighboring nodes, and the like. In some embodiments, each node of system 300 may iteratively ID initial recipient nodes and calculate a best option score and an average score. Each node may send a best option score and/or an average score to all nodes of system 300. A node of system 300 may calculi and update a best option score and/or an average score based on data received from other nodes of system 300. In some embodiments, by having each node update a best option score and average score of their own initial recipient nodes, first node 304 may select an initial recipient node based on robustness and speed of each possible pathway of other nodes of system 300.

In some embodiments, and continuing to refer to FIG. 3, node 304 may be generated from a flight controller of an aircraft. In some embodiments, all nodes of system 300 may be generated from a flight controller of an aircraft. In some embodiments, one node of system 300 may be generated from an aircraft and another node may be generated from a landing pad and/or recharging station. In some embodiments, a node 304 may be generated from an electric aircraft and may communicate charging data to node 308 which may be generated from a charging infrastructure. An electric aircraft may communicate with a charging infrastructure through one or more nodes of system 300. Communication between an electric aircraft and a charging infrastructure may include, but is not limited to, data communication about charge status of an electric aircraft, charging standards of an electric aircraft, charging compatibility of the charger 104 and the electric aircraft, estimated charging times, and the like.

Still referring to FIG. 3, in some embodiments, system 300 may include, participate in, and/or be incorporated in a network topology. A "network topology" as used in this disclosure is an arrangement of elements of a communication network. In some embodiments, system 300 may include, but is not limited to, a star network, tree network, and/or a mesh network. A "mesh network" as used in this disclosure is a local network topology in which the infrastructure nodes connect directly, dynamically, and non-hierarchically to as many other nodes as possible. Nodes of system 300 may be configured to communicate in a partial mesh network. A partial mesh network may include a communication system in which some nodes may be connected directly to one another while other nodes may need to connect to at least another node to reach a third node. In some embodiments, system 300 may be configured to communicate in a full mesh network. A full mesh network may include a communication system in which every node in the network may communicate directly to one another. In some embodiments, system 300 may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no cross-talk between the two layers which advantageously provides a redundancy and safeguard in the event of a disruption in the operation of one of the layers. A layer may be an abstraction which is not tangible.

Still referring to FIG. 3, in some embodiments, system 300 may include node 304, second node 308, third node 332, and/or fourth node 336. Node 304 may be configured to communicate with a first layer providing radio communication between nodes at a first bandwidth. In some embodiments, node 304 may be configured to communicate with a second layer providing mobile network communication between the nodes at a second bandwidth. In some embodiments, node 304 may be configured to communicate with a third layer providing satellite communication between the nodes at a third bandwidth. In some embodiments, any node of system 300 may be configured to communicate with any layer of communication. In some embodiments, a node of system 300 may include an antenna configured to provide radio communication between one or more nodes. For example, and without limitation, an antenna may include a directional antenna. In an embodiment, system 300 may include a first bandwidth, a second bandwidth, and a third bandwidth. In some embodiments, system 300 may include more or less than three bandwidths. In some embodiments, a first bandwidth may be greater than a second bandwidth and a third bandwidth. In some embodiments, system 300 may be configured to provide mobile network communication in the form a cellular network, such as, but not limited to, 2G, 3G, 4G, 5G, LTE, and/or other cellular network standards.

Still referring to FIG. 3, radio communication, in accordance with embodiments, may utilize at least a communication band and communication protocols suitable for aircraft radio communication. For example, and without limitation, a very-high-frequency (VHF) air band with frequencies between about 108 MHz and about 137 MHz may be utilized for radio communication. In another example, and without limitation, frequencies in the Gigahertz range may be utilized. Airband or aircraft band is the name for a group of frequencies in the VHF radio spectrum allocated to radio communication in civil aviation, sometimes also referred to as VHF, or phonetically as "Victor". Different sections of the band are used for radio-navigational aids and air traffic control. Radio communication protocols for aircraft are typically governed by the regulations of the Federal Aviation Authority (FAA) in the United States and by other regulatory authorities internationally. Radio communication protocols may employ, for example and without limitation an S band with frequencies in the range from about 2 GHz to about 4 GHz. For example, and without limitation, for 4G mobile network communication frequency bands in the range of about 2 GHz to about 8 GHz may be utilized, and for 5G mobile network communication frequency bands in the ranges of about 450 MHz to about 6 GHz and of about 24 GHz to about 53 GHz may be utilized. Mobile network communication may utilize, for example and without limitation, a mobile network protocol that allows users to move from one network to another with the same IP address. In some embodiments, a node of system 300 may be configured to transmit and/or receive a radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. A radio frequency (RF) transmission signal may compose an analogue and/or digital signal received and be transmitted using functionality of output power of radio frequency from a transmitter to an antenna, and/or any RF receiver. A RF transmission signal may use longwave transmitter device for transmission of signals. An RF transmission signal may include a variety of frequency ranges, wavelength ranges, ITU designations, and IEEE bands including HF, VHF, UHF, L, S, C, X, Ku, K, Ka, V, W, mm, among others.

Still referring to FIG. 3, satellite communication, in accordance with embodiments, may utilize at least a communication band and communication protocols suitable for aircraft satellite communication. For example, and without limitation, satellite communication bands may include L-band (1-2 GHz), C-band (4-8 GHz), X-band (8-12 GHz), Ku-band (12-18 GHz), Ku-band (12-18 GHz), and the like, among others. Satellite communication protocols may employ, for example and without limitation, a Secondary Surveillance Radar (SSR) system, automated dependent surveillance-broadcast (ADS-B) system, or the like. In SSR, radar stations may use radar to interrogate transponders attached to or contained in aircraft and receive information in response describing such information as aircraft identity, codes describing flight plans, codes describing destination, and the like SSR may utilize any suitable interrogation mode, including Mode S interrogation for generalized information. ADS-B may implement two communication protocols, ADS-B-Out and ADS-B-In. ADS-B-Out may transmit aircraft position and ADS-B-In may receive aircraft position. Radio communication equipment may include any equipment suitable to carry on communication via electromagnetic waves at a particular bandwidth or bandwidth range, for example and without limitation, a receiver, a transmitter, a transceiver, an antenna, an aerial, and the like, among others. A mobile or cellular network communication equipment may include any equipment suitable to carry on communication via electromagnetic waves at a particular bandwidth or bandwidth range, for example and without limitation, a cellular phone, a smart phone, a personal digital assistant (PDA), a tablet, an antenna, an aerial, and the like, among others. A satellite communication equipment may include any equipment suitable to carry on communication via electromagnetic waves at a particular bandwidth or bandwidth range, for example and without limitation, a satellite data unit, an amplifier, an antenna, an aerial, and the like, among others.

Still referring to FIG. 3, as used in this disclosure "bandwidth" is measured as the amount of data that can be transferred from one point or location to another in a specific amount of time. The points or locations may be within a given network. Typically, bandwidth is expressed as a bitrate and measured in bits per second (bps). In some instances, bandwidth may also indicate a range within a band of wavelengths, frequencies, or energies, for example and without limitation, a range of radio frequencies which is utilized for a particular communication.

Still referring to FIG. 3, as used in this disclosure "antenna" is a rod, wire, aerial or other device used to transmit or receive signals such as, without limitation, radio signals and the like. A "directional antenna" or beam antenna is an antenna which radiates or receives greater power in specific directions allowing increased performance and reduced interference from unwanted sources. Typical examples of directional antennas include the Yagi antenna, the log-periodic antenna, and the corner reflector antenna. The directional antenna may include a high-gain antenna (HGA) which is a directional antenna with a focused, narrow radio wave beamwidth and a low-gain antenna (LGA) which is an omnidirectional antenna with a broad radio wave beamwidth, as needed or desired.

With continued reference to FIG. 3, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation comput-ing devices. In some cases, a digital signal may be commu-nicated by way of one or more communication protocols, including without limitation internet protocol (IP), controller area network (CAN) protocols, serial communication pro-tocols (e.g., universal asynchronous receiver-transmitter [UART]), parallel communication protocols (e.g., IEEE 128 [printer port]), and the like.

Still referring to FIG. 3, in some cases, a node of system 300 may perform one or more signal processing steps on a sensed characteristic. For instance, a node may analyze, modify, and/or synthesize a signal representative of charac-teristic in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Dis-crete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a prob-ability distribution indicating noise, which then may be used to reduce noise in a processed signal. Additional disclosure related to a pack monitoring system can be found in U.S. patent application Ser. No. 17/478,067 entitled "SYSTEM FOR MESH NETWORK FOR USE IN AIRCRAFTS", entirety of which incorporated herein by reference.

Figure 4:
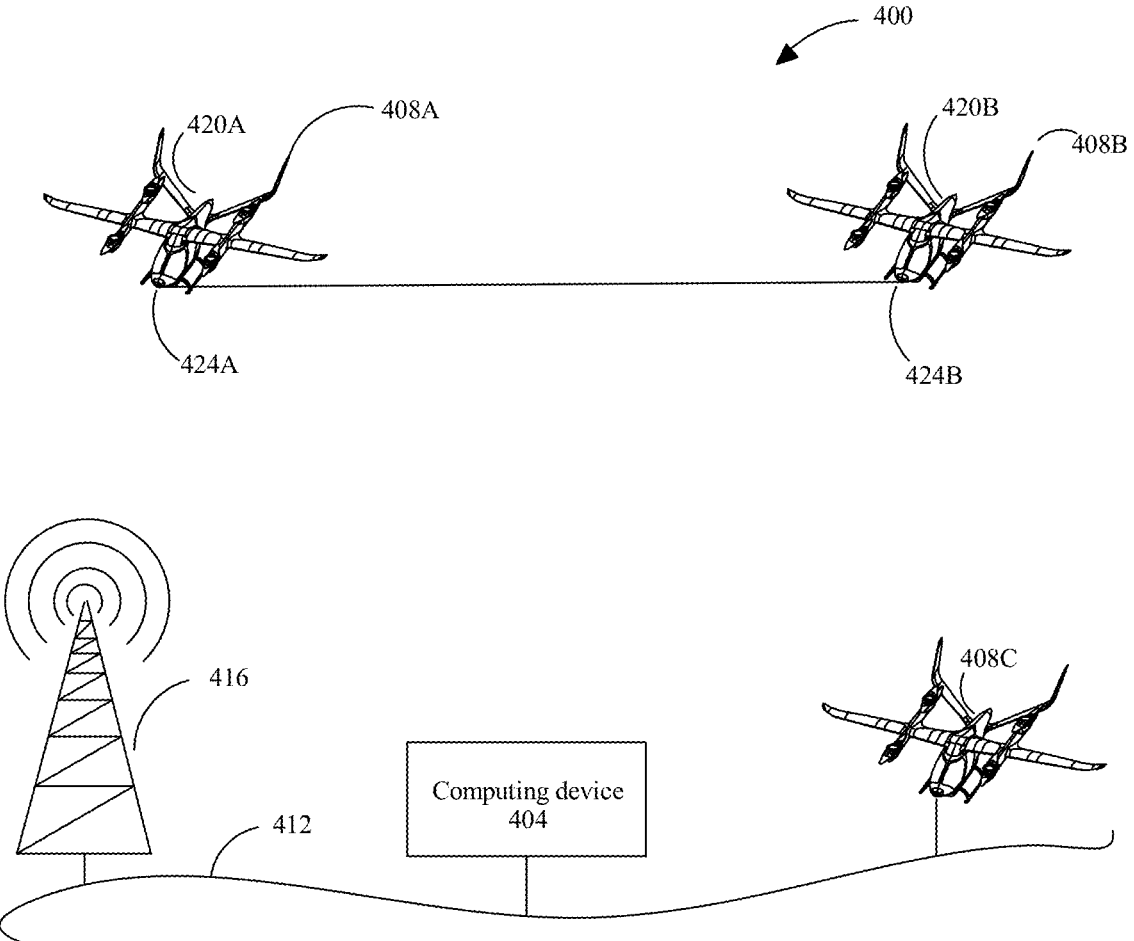
FIG. 4 is a diagram of an exemplary embodiment of an avionic mesh network in accordance with one or more embodiments of the present disclosure.

Referring now to FIG. 4, an avionic mesh network 400 is schematically illustrated. According to some embodiments, an avionic mesh network may include a single network. Alternatively or additionally, an avionic mesh network may include more than a single network. A single networks may be differentiated according to address, for example Internet Protocol address, gateway, or name server used. For example, in some cases, multiple networks may use different gateways, even though the multiple networks may still be within communicative connection with one another.

With continued reference to FIG. 4, in some embodi-ments, an avionic mesh network 400 may include inter-aircraft network nodes, intra-aircraft network nodes, as well as non-aircraft network nodes. As used in this disclosure, a "network node" is any component communicatively coupled to at least a network. For example, a network node may include an endpoint, for example a computing device on network, a switch, a router, a bridge, and the like. A network node may include a redistribution point, for example a switch, or an endpoint, for example a component commu-nicatively connected to network. As used in this disclosure, "inter-aircraft network nodes" are two or more network nodes that are physically located in two or more aircraft and communicatively connected by way of an inter-aircraft network. As used in this disclosure, "intra-aircraft network nodes" are two or more intra-aircraft network nodes that are each physically located within a single aircraft and commu-nicatively connected. As used in this disclosure, a "non-aircraft network node" is a network node that is not located on an aircraft and is communicatively connected to a net-work.

With continued reference to FIG. 4, in some embodi-ments, avionic mesh network 400 may include a wireless mesh network organized in a mesh topology. A mesh topol-ogy may include a networked infrastructure in which net-work nodes may be connected directly, dynamically, and/or non-hierarchically to many other nodes (e.g., as many other nodes as possible). In some cases, a mesh topology may facilitate cooperation between network nodes, for example redistributive network nodes, in routing of communication between network participants (e.g., other network nodes). A mesh topology may facilitate a lack of dependency on any given node, thereby allowing other nodes to participate in relaying communication. In some cases, mesh networks may dynamically self-organize and self-configure. Self-configu-ration enables dynamic distribution of workloads, particularly in event a network node failure, thereby contributing to fault-tolerance and reduced maintenance requirements. In some embodiments, mesh networks can relay messages using either a flooding technique or a routing technique. A flooding technique sends a message to every network node, flooding network with the message. A routing technique allows a mesh network to communicate a message is propagated along a determined nodal path to the message's intended destination. Message routing may be performed by mesh networks in part by ensuring that all nodal paths are available. Nodal path availability may be ensured by maintaining continuous nodal network connections and reconfiguring nodal paths with an occurrence of broken nodal paths. Reconfiguration of nodal paths, in some cases, may be performed by utilizing self-healing algorithms, such as without limitation Shortest Path Bridging. Self-healing allows a routing-based network to operate when a node fails or when a connection becomes unreliable. In some embodiments, a mesh network having all network nodes connected to each other may be termed a fully connected network. Fully connected wired networks have advantages of security and reliability. For example, an unreliable wired connection between two wired network nodes will only affect only two nodes attached to the unreliable wired connection.

With continued reference to FIG. 4, an exemplary avionic mesh network 400 is shown providing communicative connection between a computing device 404 and aircraft 408A-C. Computing device 404 may include any computing device described in this disclosure. In some embodiments, computing device 404 may be connected to a terrestrial network 412. Terrestrial networks 412 may include any network described in this disclosure and may include, without limitation, wireless networks, local area networks (LANs), wide area networks (WANs), ethernet, Internet, mobile broadband, fiber optic communication, and the like. In some cases, a grounded aircraft 408C may be connected to an avionic mesh network 400 by way of a terrestrial network 412. In some cases, avionic mesh network 400 may include a wireless communication node 416. A wireless communication node 416 may provide communicative connection by way of wireless networking. Wireless networking may include any wireless network method described in this disclosure, including without limitation Wi-Fi, mobile broadband, optical communication, radio communication, and the like. In some cases, wireless communication node 416 may be configured to connect with a first airborne aircraft in flight 408A. First airborne aircraft in some embodiments may include at least a first intra-aircraft network node 420A. As described above, first intra-aircraft network node 420A may be configured to connect to other nodes within first airborne aircraft 408A. In some cases, avionic mesh network 400 may be configured to provide inter-aircraft communication, for instance by using a first inter-aircraft network node 424A. In some cases, first inter-aircraft network node may be configured to communicate with a second inter-aircraft network node 424B. Inter-aircraft nodes 420A-B may include radio communication, cellular communication, and/or optical wireless communication, for example free space optical communication.

With continued reference to FIG. 4, avionic mesh network 400 may be additionally configured to provide for encrypted and/or secured communication between components, i.e., nodes, communicative on the network. In some cases, encrypted communication on network 400 may be provided for by way of end-to-end encryption. Exemplary non-limited end-to-end encryption methods include symmetric key encryption, asymmetric key encryption, public key encryption methods, private key encryption methods and the like. In some cases, avionic mesh network 400 and/or another network may be configured to provide secure key exchange for encryption methods. Exemplary non-limiting key exchange methods include Diffie-Hellman key exchange, Supersingular isogeny key exchange, use of at least a trusted key authority, password authenticated key agreement, forward secrecy, quantum key exchange, and the like. In some cases, an avionic mesh network 400 may include at least an optical network component, for example fiber optic cables, wireless optical networks, and/or free space optical network. In some cases, encrypted communication between network nodes may be implemented by way of optical network components. For example, quantum key exchange in some embodiments, may defeat man-in-the-middle attacks. This is generally because, observation of a quantum system disturbs the quantum system. Quantum key exchange in some cases, uses this general characteristic of quantum physics to communicate sensitive information, such as an encryption key, by encoding the sensitive information in polarization state of quantum of radiation. At least a polarization sensitive detector may be used to decode sensitive information.

Still referring to FIG. 4, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 4, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 4, in some cases, avionic mesh network 400 may be configured to allow message authentication between network nodes. In some cases, message authentication may include a property that a message has not been modified while in transit and that receiving party can verify source of the message. In some embodiments, message authentication may include us of message authentication codes (MACs), authenticated encryption (AE), and/or digital signature. Message authentication code, also known as digital authenticator, may be used as an integrity check based on a secret key shared by two parties to authenticate information transmitted between them. In some cases, a digital authenticator may use a cryptographic hash and/or an encryption algorithm.

Still referring to FIG. 4, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 4, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grostl hash function, the HAS-160 hash function, the JH hash function, the RadioGatUn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 4, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 4, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 4, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 4, zero-knowledge proof may include any other suitable zero-knowledge proof. Zero-knowledge proof may include, without limitation bullet-proofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 4, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 4, as described above in some embodiments an avionic mesh network 400 may provide secure and/or encrypted communication at least in part by employing digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 4, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 4, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 5:
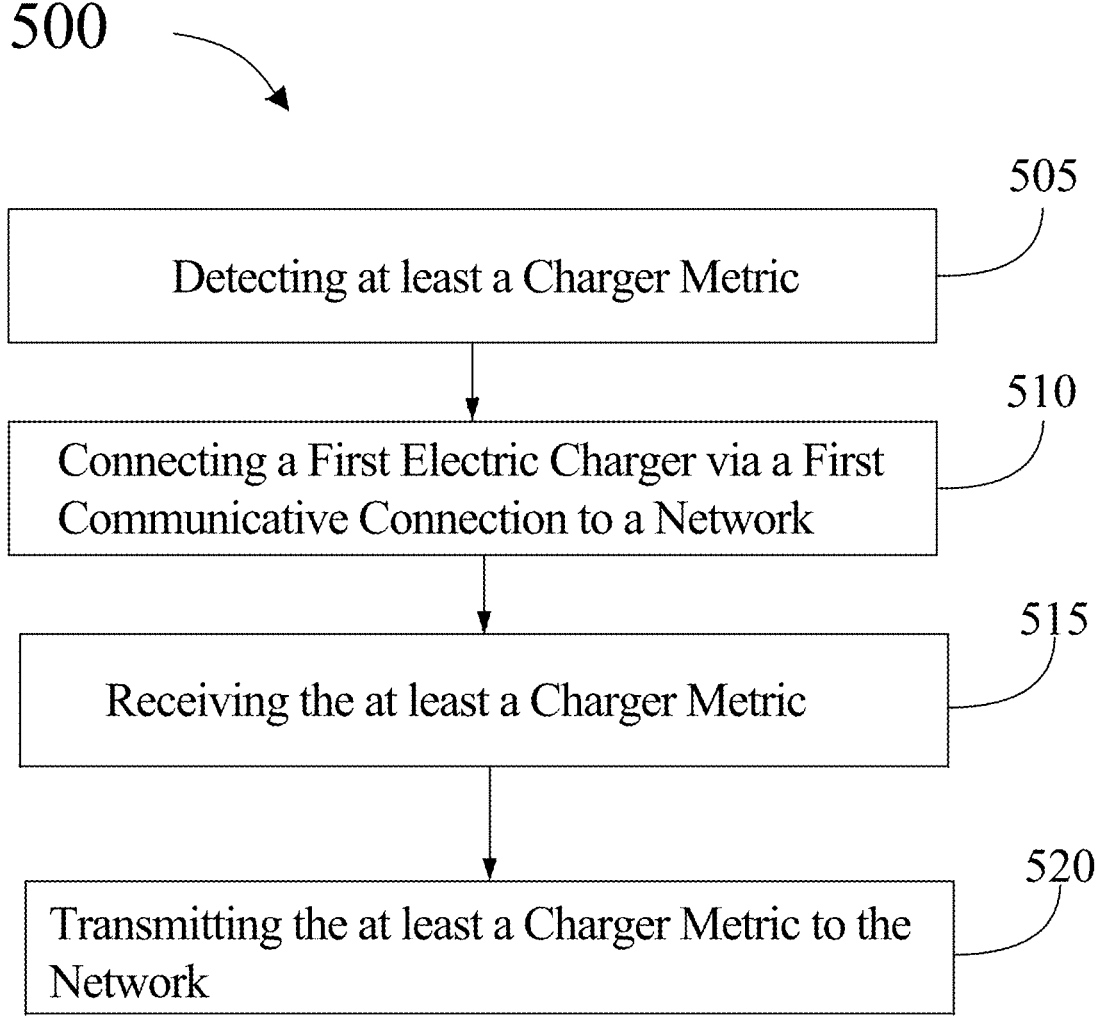
FIG. 5 is a flowchart of a method of electric charger communication in accordance with one or more embodiments of the present disclosure.

Referring now to FIG. 5, method 500 of electric charger communication is presented. At step 505, method 500 includes detecting, using a sensor communicatively connected to a first electric charger, at least a charger metric of the first electric charger. A charger metric may include measurements of electric parameters of charger or electric aircraft, malfunction detections, voltages, currents, and the like. This step may be implemented without limitation as described above in FIGS. 1-4.

Still referring to FIG. 5, at step 510, method 500 includes connecting, by a first networking component of the first electric charger, the first electric charger to a network using a first communicative connection. A communicative connection may include a bandwidth and/or frequency. In some embodiments, a communicative connection may include one or more subchannels. In various other embodiments, aircraft data may also be communicated through communicative connection. Aircraft data may include, but is not limited to, battery data, propulsor data, flight parameter data, and the like. This step may be implemented without limitation as described above in FIGS. 1-4.

Still referring to FIG. 5, at step 515, method 500 includes receiving, from the sensor communicatively connected to the first electric charger, the at least a charger metric from the sensor. This step may be implemented without limitation as described above in FIGS. 1-4.

Still referring to FIG. 5, at step 520, method 500 includes transmitting the at least a charger metric to the network using the first communicative connection, wherein the at least a charger metric includes a charger status. This step may be implemented without limitation as described above in FIGS. 1-4.

Still referring to FIG. 5, method 500 may further include connecting, by a second networking component, to the network using a second communicative connection. This step may be implemented without limitation as described above in FIGS. 1-4. In some embodiments, the second networking component may be installed in a second electric charger. In some embodiments, second networking component may be installed in an electric aircraft. In some embodiments, method 500 may further include receiving, by the second networking component, the charger status from the network node, wherein the second networking component is communicatively connected to a network node on the network. This step may be implemented without limitation as described above in FIGS. 1-4. In some embodiments, method 500 may further include establishing the first communicative connection between the first networking component and the network node as a function of a communication criterion. This step may be implemented without limitation as described above in FIGS. 1-4. In some embodiments, the charger status may include a charge time remaining estimate. In some embodiments, method 500 may include adjusting a bandwidth of the first communicative connection using the first networking component. This step may be implemented without limitation as described above in FIGS. 1-4. In some embodiments, method 500 may include receiving the battery metric from the sensor. This step may be implemented without limitation as described above in FIGS. 1-4. In some embodiments, method 500 may further include transmitting the battery metric to the network using the first communicative connection. This step may be implemented without limitation as described above in FIGS. 1-4.

Figure 6:
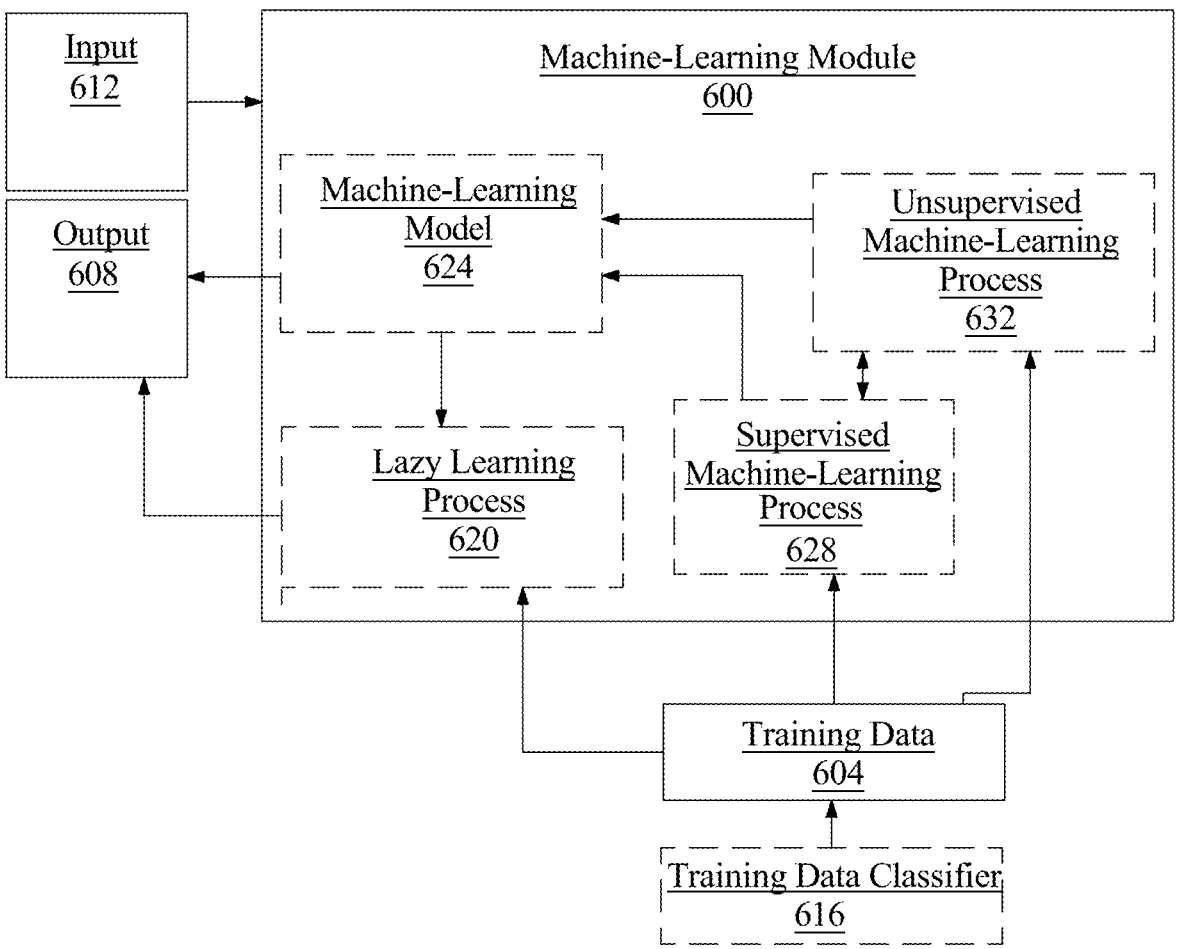
FIG. 6 is a block diagram of a machine-learning module in accordance with one or more embodiments of the present disclosure.
Figure 7:
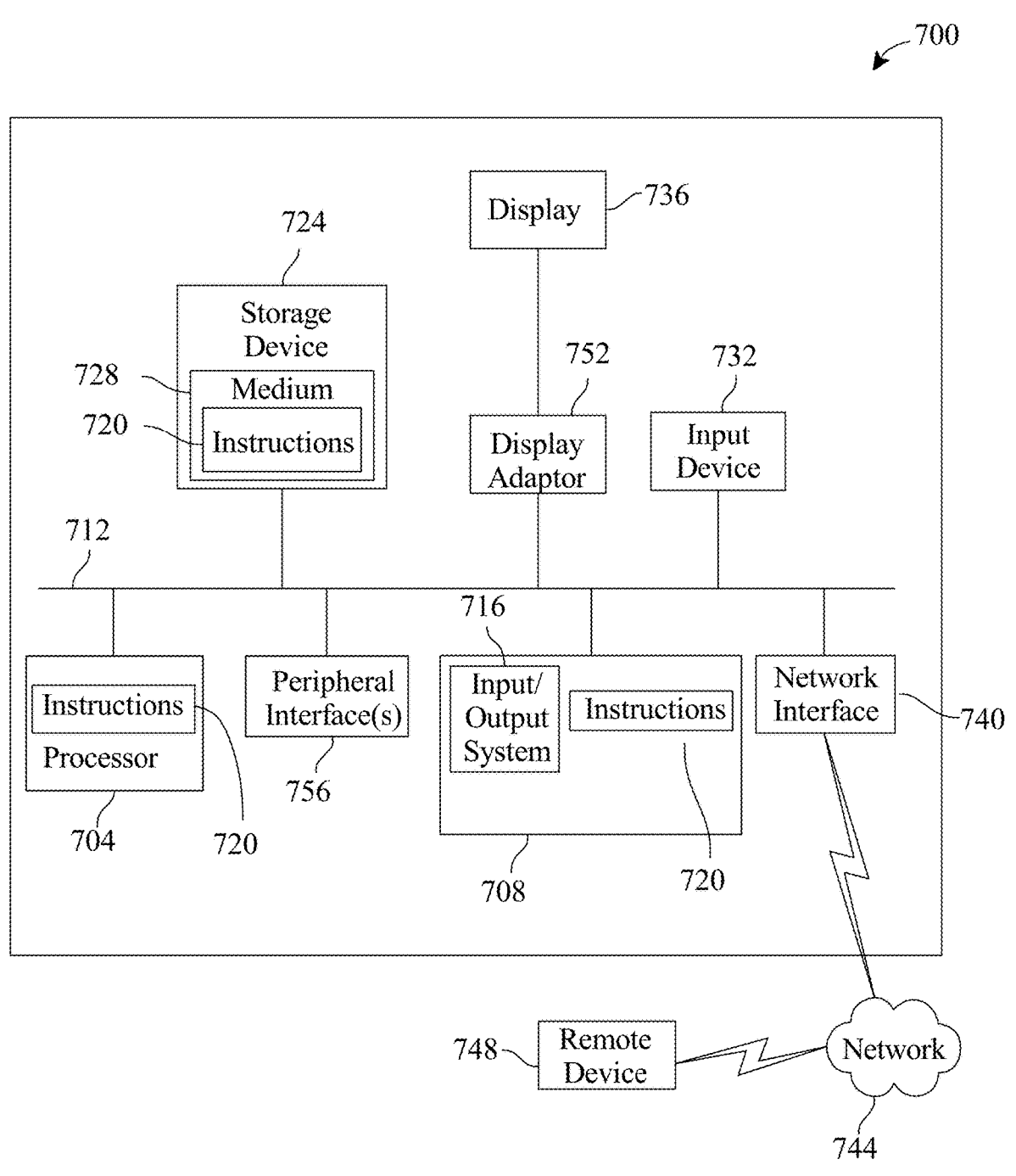
FIG. 7 is a block diagram of a computing system that can be used to implement any one or more of the methodologies disclosed herein and any one or more portions thereof.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process", as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below.

Training data 604 used by machine-learning module 600 may correlate any input data as described in this disclosure to any output data as described in this disclosure. As a non-limiting illustrative example inputs may include communication metrics and outputs may include communication criterion.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of communication metrics to ranges, altitudes, trajectories, noise, error rate, and the like.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include communication metrics as described above as inputs, communication criterion as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Still referring to FIG. 8, processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 8, memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Still referring to FIG. 8, computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Still referring to FIG. 8, computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

Still referring to FIG. 8, a user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Still referring to FIG. 8, computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for electric charger communication, comprising:
a network;
at least a first and a second electric charger, each of the electric chargers comprising:
a sensor configured to detect at least a charger metric;
a networking component configured to connect the corresponding electric charger to the network using a communicative connection, wherein the communicative connections to a given charger picked based on communication criterion including weighted attributes of distance from the charger, altitude difference from the charger, velocity of the aircraft, and bandwidth of the charger;
at least a processor communicatively connected to the networking component and the sensor; and
a memory communicatively connected to the at least a processor, the memory containing instructions configuring the at least a processor to:
receive the at least a charger metric from the corresponding sensor; and
transmit the at least a charger metric to the network using the corresponding communicative connection, wherein the at least a charger metric comprises a charger status; and
a second networking component, installed in an electric aircraft and configured to connect to the network using a second communicative connection,
wherein the second networking component is communicatively connected to an inter-aircraft network, and configured to receive the charger status from the network and transmit the charger metric to one or more additional aircraft of the inter-aircraft network.

2. The system of claim 1, further comprising a third networking component configured to connect to the network using a third communicative connection and wherein the third networking component is installed in a second electric charger.

3. The system of claim 1, wherein the charger status comprises a charge time remaining estimate.

4. The system of claim 1, wherein the memory contains instructions further configuring the at least a processor to adjust a bandwidth of the first communicative connection using the first networking component.

5. The system of claim 1, wherein the sensor is further configured to detect a battery metric.

6. The system of claim 5, wherein:
the memory contains instructions further configuring the processor to:
receive the battery metric from the sensor; and
transmit the battery metric to the network using the first communicative connection.

7. The system of claim 1, wherein the at least a charge metric includes an energy cost.

8. The system of claim 1, wherein the at least a charge metric includes a power generation type.

9. A method of electric charger communication, comprising:

detecting, using a sensor communicatively connected to a first electric charger, at least a charger metric of the first electric charger;

connecting, by a first networking component of the first electric charger, the first electric charger to a network using a first communicative connection;

receiving, from the sensor communicatively connected to the first electric charger, the at least a charger metric from the sensor;

transmitting the at least a charger metric to the network using the first communicative connection, wherein the at least a charger metric comprises a charger status; and connecting a second networking component, installed in an electric aircraft, to the network using a second communicative connection, wherein the second networking component is communicatively connected to an inter-aircraft network, and configured to receive the charger status from the network and transmit the charger metric to one or more additional aircraft of the inter-aircraft network;

detecting, using a sensor communicatively connected to a second electric charger, at least a charger metric of the second electric charger;

connecting, by a second networking component of the second electric charger, the second electric charger to a network using a second communicative connection;

receiving, from the sensor communicatively connected to the second electric charger, the at least a charger metric from the sensor;

transmitting the at least a charger metric to the network using the second communicative connection, wherein the at least a charger metric comprises a charger status; and connecting a second networking component, installed in an electric aircraft, to the network using a second communicative connection, wherein the second networking component is communicatively connected to an inter-aircraft network, and configured to receive the charger status from the network and transmit the charger metric to one or more additional aircraft of the inter-aircraft network; and choosing either the first or second charger to communicate with based on communication criterion including weighted attributes of distance from the charger, altitude difference from the charger, velocity of the aircraft, and bandwidth of the charger.

10. The method of claim 9, further comprising connecting a third network component to the network using a third communicative connection, wherein the third networking component is installed in a second electric charger.

11. The method of claim 9, wherein the charger status comprises a charge time remaining estimate.

12. The method of claim 9, further comprising adjusting a bandwidth of the first communicative connection using the first networking component.

13. The method of claim 9, further comprising detecting, using the sensor, a battery metric.

14. The method of claim 13, further comprising:

receiving the battery metric from the sensor; and transmitting the battery metric to the network using the first communicative connection.

15. The method of claim 9, wherein the at least a charge metric includes an energy cost.

16. The method of claim 9, wherein the at least a charge metric includes a power generation type.

\* \* \* \* \*